(12) United States Patent
Emam et al.

(10) Patent No.: US 8,694,801 B2
(45) Date of Patent: *Apr. 8, 2014

(54) METHOD AND COMPUTER PROGRAM FOR SECURELY STORING DATA

(75) Inventors: Ossama Emam, Giza (EG); Genady Grabarnik, Scarsdale, NY (US); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,690

(22) Filed: Jul. 25, 2012

(65) Prior Publication Data

US 2012/0290851 A1  Nov. 15, 2012

Related U.S. Application Data

(63) Continuation of application No. 12/303,853, filed on May 18, 2010, now Pat. No. 8,291,240.

(30) Foreign Application Priority Data

Jun. 13, 2006 (EP) ..................................... 06115335

(51) Int. Cl.
*G06F 11/30* (2006.01)
*G06F 12/14* (2006.01)
*H04L 29/06* (2006.01)
*G06F 15/173* (2006.01)

(52) U.S. Cl.
USPC .............. 713/193; 709/223; 726/27; 713/165

(58) Field of Classification Search
None
See application file for complete search history.

(56) References Cited

U.S. PATENT DOCUMENTS

| 6,735,695 | B1 * | 5/2004 | Gopalakrishnan et al. ... | 713/186 |
| 6,988,279 | B1 | 1/2006 | Kanevsky | |
| 2006/0067297 | A1 * | 3/2006 | Chaar et al. .................... | 370/352 |
| 2006/0168185 | A1 * | 7/2006 | McCall et al. ................ | 709/223 |
| 2006/0177061 | A1 * | 8/2006 | Orsini et al. ................... | 380/268 |
| 2007/0067332 | A1 * | 3/2007 | Gallagher et al. ............ | 707/102 |

FOREIGN PATENT DOCUMENTS

| FR | 2846763 A1 | 5/2004 |
| JP | 2006018772 A | 1/2006 |
| WO | 2004059529 A2 | 7/2004 |

OTHER PUBLICATIONS

Doan, U.S. Appl. No. 12/303,853, "Notice of Allowance," Jun. 12, 2012, 9 pages.
Doan, U.S. Appl. No. 12/303,853, "Final Office Action," Mar. 1, 2012, 12 pages.

(Continued)

*Primary Examiner* — Cordelia Zecher
*Assistant Examiner* — Trang Doan
(74) *Attorney, Agent, or Firm* — Jean M. Sullivan; Hoffman Warnick LLC

(57) ABSTRACT

A method of securely storing data comprising the steps of: dividing the data into a plurality of secure components; encrypting the secure components; moving each secure component to a different location which is substantially inaccessible to an unauthorized request; storing the secure components at the different locations for a period of time; repeating the moving and storing steps; moving all of the secure components to a single location in response to an authorized request; decrypting each of the secure components; and assembling the plurality of secure components to reconstruct the original data.

20 Claims, 5 Drawing Sheets

(56) References Cited

OTHER PUBLICATIONS

Doan, U.S. Appl. No. 12/303,853, "Office Action," Sep. 16, 2011, 18 pages.
Tadahiko Kataoka, Information Materials for IDS, Date of JP Office Action Jul. 26, 2011, 2 pages.
Luis-Felipe Cabrera et al, "Swift: A Storage Architecture for Large Objects", Proceedings of the Symposium on Mass Storage Systems, Monterey, vol. 11, pp. 123-128, Oct. 7, 1991.
Michael O. Rabin, "Efficient Dispersal of Information for Security, Load Balancing, and Fault Tolerance", Journal of the Association for Computing Machinery, vol. 36, No. 2, pp. 335-348, Apr. 1, 1989.
Adi Shamir, "How to Share a Secret", Communications of the Association for Computing Machinery, ACM, New York, NY, vol. 22, No. 11, pp. 612-613, Nov. 1, 1979.
PCT, "Notification of Transmittal of the International Search Report and the Written Opinion of the International Searching Authority, or the Declaration", International Application No. PCT/EP2007/053547, International Filing Date Apr. 12, 2007.

* cited by examiner

METHOD AND COMPUTER PROGRAM FOR SECURELY STORING DATA

This application is a continuation of U.S. patent application Ser. No. 12/303,853, filed on 18 May 2010, now issued as U.S. Pat. No. 8,291,240, which is incorporated herein by reference in its entirety for all that it contains in order to provide continuity of disclosure.

TECHNICAL FIELD

The present invention relates to a method, system and computer program for securely storing data.

BACKGROUND

Devices (such as computers) and secure facilities, often contain proprietary and/or sensitive information for prolonged periods of time, wherein the information could be compromised if accessed by unauthorized individuals. Thus, such devices and facilities often employ security procedures to prevent unauthorized users from accessing, obtaining or altering such information. Such procedures (also known as access control mechanisms) employ authentication techniques to allow users to prove their identity and if authorized to do so, gain access to a given device or facility.

A number of authentication protocols have been developed to prevent unauthorized access to devices or facilities. In particular, many authentication protocols use an alphanumeric personal identification number (PIN) or password known only to the authorized user, so that when attempting to access a device or facility, the user must enter the appropriate PIN/password, to establish his/her authorization to do so. However, many users select a PIN/password that is easy to remember. Consequently, there is a significant risk that the password/PIN may be guessed or otherwise compromised, thereby enabling an attacker to gain access to the device or facility.

To minimize the risk of a password being compromised, many authentication protocols impose a limit on the number of attempts that a user may make to enter a PIN/password. This prevents an attacker from repeatedly entering different passwords until successful. In addition, many authentication protocols encourage or require users to change their PIN/password periodically.

Some authentication protocols employ one-time passwords, wherein users are assigned a secret key that may be stored on a pocket token or a computer-readable card. Under these protocols, when an attempt is made to access a device or facility, a random value (known as a challenge) is issued to the user. The pocket token or computer-readable card encrypts the challenge with the user's secret key and the user gains access to the device or facility if the encrypted challenge is correct. In order to ensure that the pocket token or computer-readable card is itself used by an authorized user, the user must also manually enter a secret alphanumeric PIN or password.

While such authentication tools reduce the risk of unauthorized access to equipment or facilities, they suffer from a number of limitations. For example, the requirement, with one-time passwords, for a user to carry a pocket token or computer-readable card may render the widespread deployment of the protocol impractical.

SUMMARY OF INVENTION

The present invention is directed to a method, system and computer program for securely storing data as defined in the independent Claims. Further embodiments of the invention are provided in the appended dependent Claims.

The present invention takes a different approach to the problem of securely storing sensitive information, insofar as it recognises that (regardless of the user-authentication scheme used) the storage of information in a single location for prolonged periods of time, inherently renders the information vulnerable to unauthorised access. The present invention overcomes this problem by combining the above-mentioned user-authentication procedures with a data segmentation approach that breaks sensitive information into a number of portions and distributes the portions to different locations in a network. The present invention only re-assembles the individual portions if the identity and authorisation of a prospective user is authenticated.

Accordingly, even if an unauthorised user were to gain access to the network, the unauthorised user would (without the appropriate authentication) find it extremely difficult to locate and assemble all the portions. To further enhance the security of the stored information, its portions are continuously and individually moved about different destinations in the network (to be briefly stored thereat before moving to the next destination), so that at any given time, it would be virtually impossible for an unauthorised person to determine the location of any given portion of information.

The present invention employs intelligent agents (IAs) to move the portions about the network. Intelligent agents are particularly suited to this task because they can securely travel in a network, through the different computers connected thereto. In view of the growing number of devices and media available for accessing information, a further advantage of IAs is their ability to access a wide variety of devices (e.g. computers, switches, PDAs, and cellular telephones) and travel through different media. Similarly, IAs have the ability to receive messages in different media (e.g. voice message over radio) and interpret their content.

Furthermore, the use of IAs enables further features to be introduced into the present invention. For example, a shadowing feature may be provided, which enables "false" keys to be introduced into the network. This improves security by adding a probabilistic aspect thereto.

On another topic, since the identity of participating servers is irrelevant to the operation of the present invention, the invention has limited exposure to undiscovered corrupted servers.

BRIEF DESCRIPTION OF THE DRAWINGS

The above and other objects, features and advantages of the invention will be better understood by reading the following particular description of the invention in conjunction with the accompanying drawings in which.

DETAILED DESCRIPTION OF THE INVENTION

The following discussion will provide a broad overview of the method of securing data in a network, followed by a more detailed description of the operations performed at different stages in the method. The more detailed description will be based on an example in which a document is secured. However, as will be seen, the method is not restricted to documents and can in fact be used to secure any form of data including security keys and biometric data.

1. Broad Overview

The method of securing data is implemented in an infrastructure that may comprise a plurality of specialized servers distributed in a number of different geographical locations and interconnected by a communication means.

Figure 1:
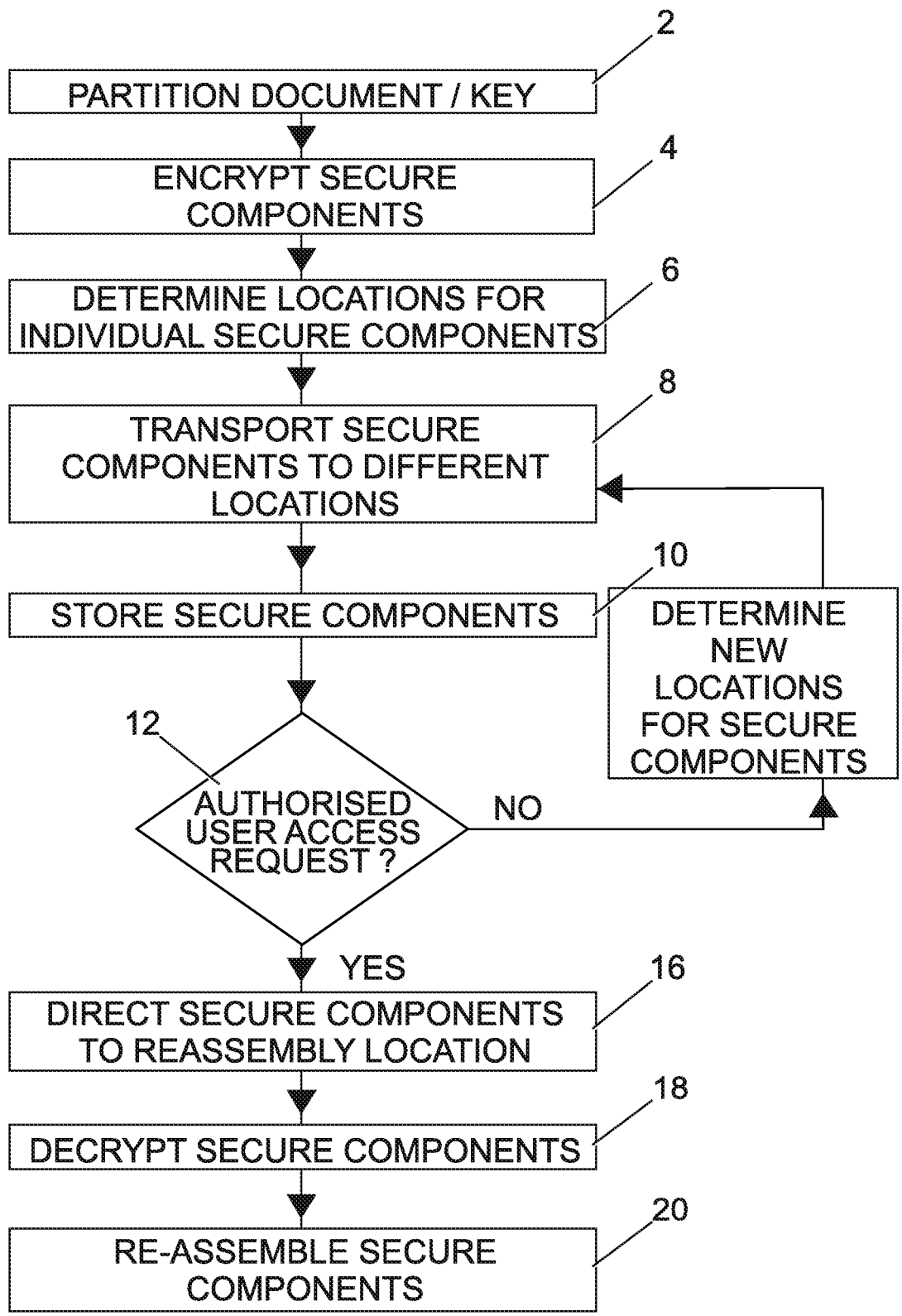
FIG. 1 is a flowchart providing a broad overview of the method of securely storing data.

Referring to FIG. 1, the method provides a mechanism for partitioning 2 a secure document, and encrypting 4 each of the partitions. The partitions are sent 8 to different destinations so that it is impossible to establish their location.

The partitions do not remain at these destinations, but are instead, stored 10 there for a brief period of time before being moved to another destination. Thus, over a prolonged period of time, the partitions are, in effect, constantly moved about the network from one destination to another. The movements of the partitions may be directed by specified rules known only to a central controller. On receipt of a valid user access request 12, all the partitions are assembled 16 at a single location, decrypted 18 and combined 20 into a single document.

In an alternative but analogous fashion to the above-described process, a security key may be split 2 into parts, encrypted 4 and transported 8 by different pathways to different destinations in the network (where the parts are briefly stored before being moved to another destination). Since the different parts of the key are constantly moving within the network, they cannot be intercepted by an intruder. For the sake of simplicity, the data (e.g. documents and security keys) secured by the above method will be generically known henceforth as secure components.

In another variant of the method of securing data, even the central controller is unaware of the pathways and locations of the secure components. In this case, upon receipt of a valid user access request, the central controller sends a particular message to the entire network. When the secure components receive this message, they are all directed to move to a specific location for re-assembly, wherein the address of the location is specified in the message.

Since, at any given time, there may be multiple secure components traveling to and from different places in the network, there is a risk that some of the secure components may not be able to move to the designated re-assembly location. This problem is solved in a similar manner to that described in U.S. Pat. No. 6,735,695, and allows the reconstruction of a document (or key etc.) from the partial information obtained from the subset of secure components that are successfully moved to the re-assembly point.

More precisely, U.S. Pat. No. 6,735,695 describes a biometrics security system that uses a portion of biometric data to validate a user's identity. Upon receipt of a user request to access a secure device or facility (henceforth known as a user access request), a central biometric security system causes a sample to be obtained of a portion of the user's biometric information. The central biometric security system compares the sample from the user with a corresponding portion of a biometrics prototype in a database of registered users. In one variant, the central biometric security system transmits an agent to the user's computing device upon receipt of a user access request. The agent obtains a sample of a portion of the user's biometric information which the agent transmits to the central biometric security system.

2. More Detailed Description

(a) Partitioning a Secure Document

Figure 2:
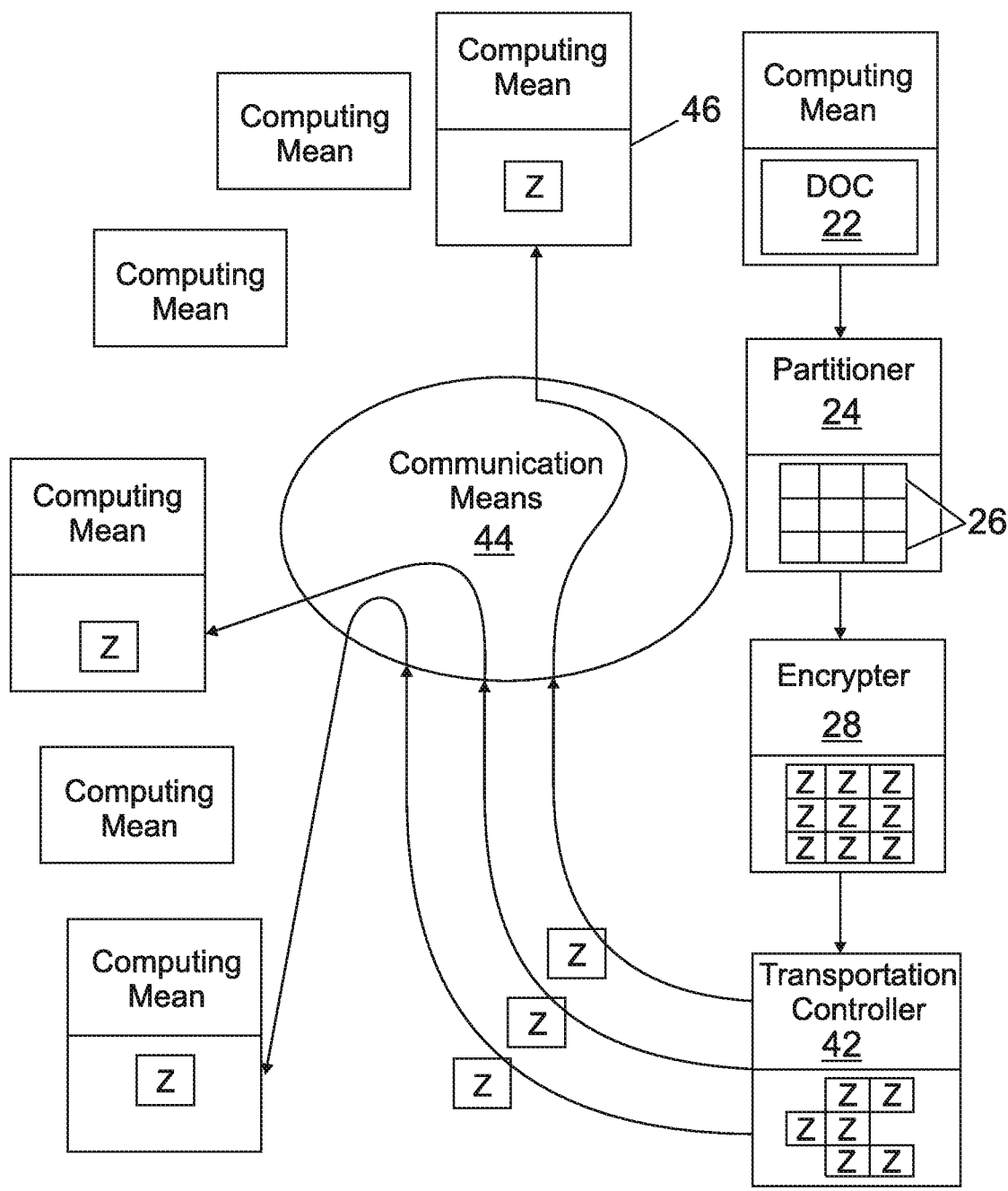
FIG. 2 is a block diagram of the partitioning of a document into a plurality of secure components and the transport of these secure components to different locations in the network.

Referring to FIG. 2, a document 22 is partitioned by a partitioner 24 to create a plurality of secure components 26. The document 22 may be partitioned in a sequential manner or in a graphical manner (e.g. by taking a graphical representation of the document and partitioning it based on particular picture regions).

As previously mentioned, a document 22 is only one example of data that can be partitioned. Indeed, any kind of data (including biometric data and security keys) can be treated in a similar way. More particularly, since any piece of data can be represented as a sequence of bits (e.g. $x_1, x_2, x_3, \ldots x_N$), this sequence of bits can be split into m parts (wherein each part comprises M=N/m bits) in accordance with a variety of rules. For example, let M=3, then a first subset $S_1$ of the bit sequence may comprise $(x_1, x_4, x_7)$, similarly, a second subset $S_2$ may comprise $(x_2, x_5, x_8)$ and a third subset $S_3$ may comprise $(x_3, x_6, x_9)$.

More particularly and in accordance with the secret sharing principle (A. Shamir, *Communications of the ACM*, 22(1), pp 612-613, 1979), the document is partitioned so that when later encrypted, every k out of the m partitions permits the reconstruction of the entire document, and a smaller number of partitions will not enable such reconstruction.

(b) Encrypting Secure Components

Each secure component 26 is encrypted by an encrypter 28 to produce encrypted secure components Z. The encryption is performed by a process based on RSA and public/private keys and is executed by a number of intelligent agents (IAs) that also act as containers for the resulting encrypted secure components Z. IAs are program packets that can move in a network from one computer to another and perform a variety of tasks therein. A more detailed discussion of IAs can be found at (www.computer.org/concurrency/pd1999/pdf/p3O8O.pdf).

Figure 3:
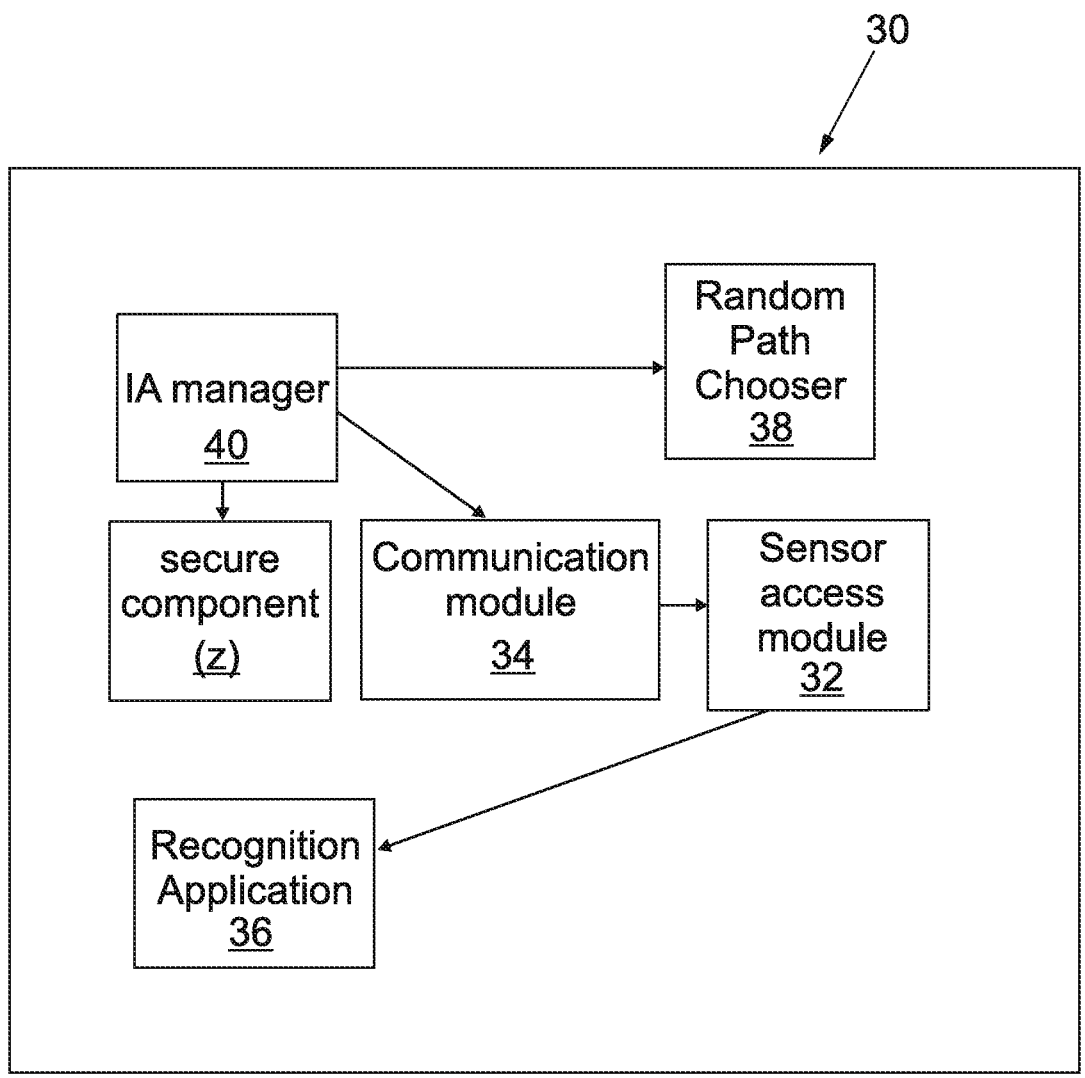
FIG. 3 is a block diagram of an IA used in the method depicted in FIG. 1.

Referring to FIG. 3, an IA 30 adapted to carry a secure component Z inside it comprises a sensor access module 32 that enables the IA 30 to communicate with sensors and read data therefrom. For example, the IA 30 may communicate with a microphone to acquire audio information. Alternatively, the IA 30 may communicate with a camera to acquire textual data. This ability enables the IA 30 to receive messages from a central controller (not shown) advising the IA 30 as to when and where it should travel to a given reassembly location whereat its secure component Z is integrated with other secure components.

The IA 30 also has a communication module 34 to enable it to communicate with a central controller (not shown) through different media. The IA 30 may include its own message recognition/interpretation applications (not shown) that allow the IA 30 to interpret audio and text data. Alternatively, the IA 30 may interact with servers operating these recognition applications and obtain appropriately interpreted message data from these applications.

The IA 30 also comprises a random path chooser 38 that chooses random paths for IA 30 to travel in a network. Finally, the IA 30 also comprises an IA manager block 40 that controls all of the previously mentioned features in the IA 30.

On another note, it will also be realized that IA's can communicate amongst themselves through different media as described in US Patent application No. US20060067297.

(c) Directing Secure Components to Different Locations in the Network

Returning to FIG. 2, once the secure components 26 have been encrypted, a transportation controller 42 directs (through a communication means 44) the corresponding IAs to a plurality of destinations 46. the destinations may be located inside a single computer (e.g. different directories or threads) or in different geographical locations (e.g. in different computers/servers).

Figure 4:
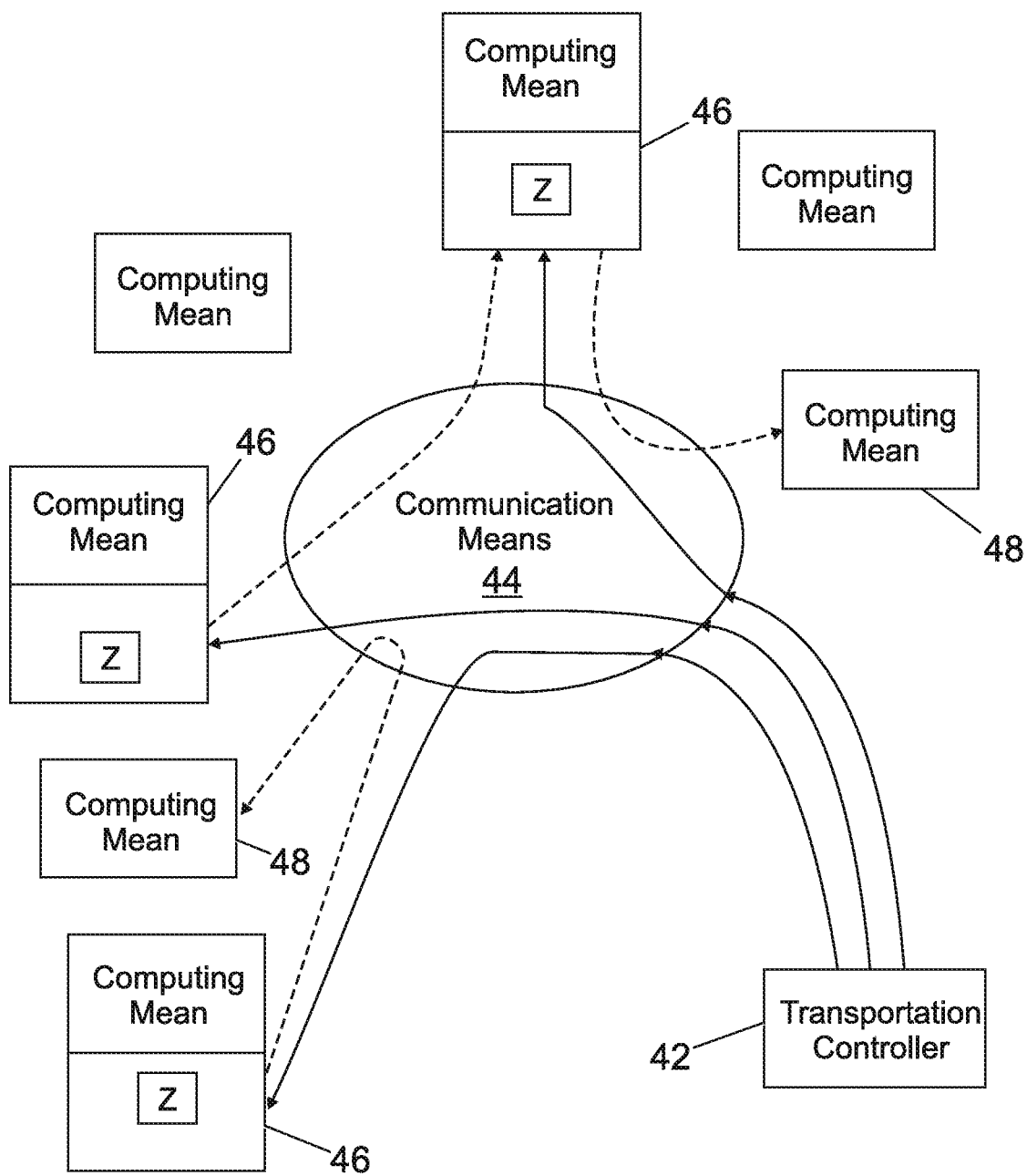
FIG. 4 is a block diagram of the process by which the locations of IAs are constantly changed in the network of FIG. 2.

As previously mentioned, the IAs do not remain at these destinations 46. Instead, the IAs are constantly moved about in the network from one location to another. Referring to FIG. 4, in one embodiment, the transportation controller 42 sends (as depicted by the solid-line arrows) a message to each position 46 at which an IA is located. The message indicates the next location 48 of the IA in question. The IA is redirected to the next location 48 (following the trajectories shown as dotted-line arrows).

More specifically, in the present embodiment, the transportation controller 42 controls when, and where the IAs are stored before they are moved to a different destination. The transportation controller 42 may determine the destination of an IA by means of a randomised (e.g. memory-less random) procedure in an attempt to prevent the movement patterns of the IAs from being predicted by potential hackers.

Alternatively, the transportation controller 42 may determine the destination of an IA by means of an internal local transportation algorithm, or under instruction from a command center (not shown). Nonetheless, regardless of the specific mechanism used by the transportation controller 42 to determine the destination of an IA, the underlying purpose of this process is to reduce the risk of the IAs being eavesdropped on, or intercepted.

As will be recalled, in another embodiment, the transportation controller 42 is unaware of the location of the IAs, and the IAs employ an internal randomized rule-set for determining their next destination.

(d) Recombination of Secure Components

Figure 5:
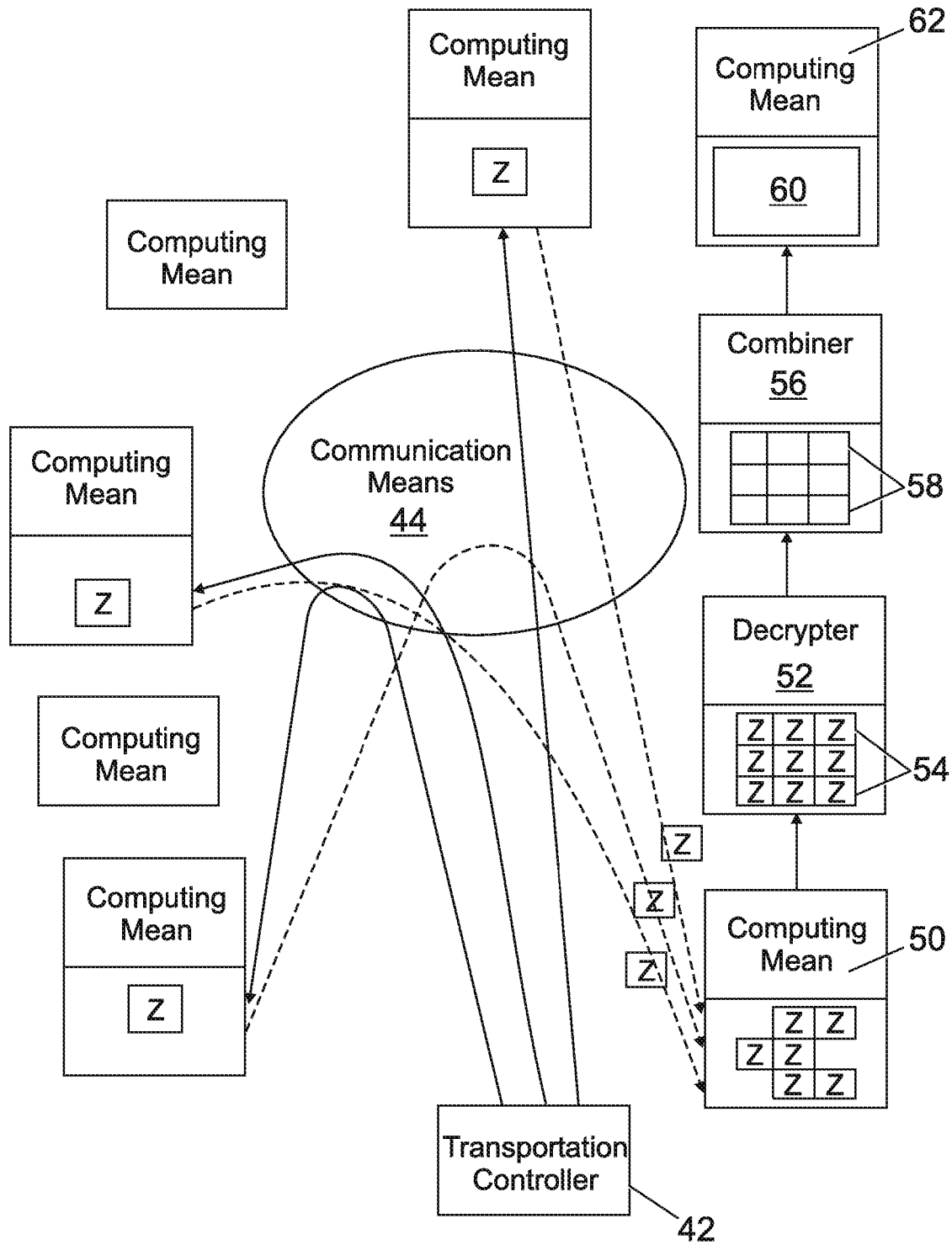
FIG. 5 is a block diagram of the process by which encrypted secure components are assembled at a reassembly location, decrypted and reconstructed into an original document.

Referring to FIG. 5, when required, the transportation controller 42 transmits a message (as shown by the solid-line arrows) to the network requesting all the IAs to move to the reassembly location 50. The IAs move to a reassembly location 50 through communication means 44 (the trajectories of the IAs being shown by the dotted-line arrows). Once assembled at the reassembly location 50, a decrypter 52 decrypts the encrypted secure components 54 housed within the IAs. A combiner 56 then assembles the decrypted secure components 58 into a reconstructed document 60 and transmits the reconstructed document 60 to a final location 62.

The reassembly operation is enabled by indexing each component from the original document and maintaining a table listing the indices in the order with which their corresponding secure components appeared in the original document. Using the previously described example, the recombination of subsets $S_1=(x_1, x_4, x_7)$, $S_2=(x_2, x_5, x_8)$ and $S_3=(x_3, x_6, x_9)$ into the original document is done by integrating bits in $S_1$, $S_2$ and $S_3$ into $S=(x1, x2, x3, x4, \ldots)$ so that the order of the indices from the original document is preserved (i.e. wherein every next bit $x_i$ is larger than the previous bit $x_{i-1}$).

As an aside, the method of U.S. Pat. No. 6,988,279 is used to prevent an intruder from copying the secure components and using them to reconstruct the original document. More particularly, U.S. Pat. No. 6,988,279 provides a mechanism for authenticating an IA by ascertaining the location and identity of an IA attempting to gain access to a computer or facility etc. The IA is identified by means of an identification tag associated therewith. The method of U.S. Pat. No. 6,988,279 compares the location and identity of the IA with entries in a register of identification tags and possible locations at which the registered IAs may gain access. In the event that the identity and location of the IA attempting to gain access matches an entry in the register, the IA is allowed access to the required server, facility etc.

Modifications and alterations to the above may be made without departing from the scope of the invention.

What is claimed is:

1. A non-transitory computer program product for securely storing data, the computer program product comprising a computer readable storage medium having program code embodied therewith, the program code executable by a computing device to:
   divide the data into a plurality of secure components;
   encrypt the secure components,
   wherein the encrypting includes storing the plurality of secure components on a plurality of intelligent agents;
   move each intelligent agent to a different location which is substantially inaccessible to an unauthorized request;
   store the intelligent agents at the different locations for a period of time;
   continuously repeat the moving and storing such that each of the intelligent agents is moved and stored at other different locations,
   wherein the continuously repeating of the moving and storing constantly relocates the intelligent agents until an authorized request is received;
   move all of the intelligent agents to a single location in response to receipt of the authorized request;
   decrypt each of the secure components stored on the intelligent agents,
   wherein decrypting includes accessing the secure components stored on the intelligent agents; and
   assemble the plurality of secure components to reconstruct the original data.

2. The computer program product of claim 1 wherein the program code is further configured to enable the computing device to move all of the secure components to the single location on receipt of a request from an authorized user.

3. The computer program product of claim 2 wherein the program code is further configured to enable the computing device to:
   ascertain a location from which the request originated; and
   use the location to determine whether the user is authorized to access the data.

4. The computer program product of claim 1 wherein the program code is further configured to enable the computing device to move all of the secure components to a single location on receipt of a pre-determined command.

5. The computer program product of claim 1 wherein the program code is further configured to enable the computing device to move all of the secure components to a single location on satisfying a scheduling requirement.

6. The computer program product of claim 1 wherein the program code is further configured to enable the computing device to send a message to each secure component before moving the secure components to the single location.

7. The computer program product of claim 1 wherein the program code is further configured to enable the computing device to:
   select a location for each secure component in a randomized fashion; and
   move each secure component to the location selected therefor.

8. The computer program product of claim 1 wherein the program code is further configured to enable the computing device to:

receive instructions specifying the location for each secure component; and move each secure component to the location specified therefor.

9. The computer program product of claim 1 wherein the program code is further configured to enable the computing device to divide the data so that a subset of the secure components is sufficient to reconstruct the data.

10. A method of generating a computer system for securely storing data, the method comprising:

providing a computer system operable to:

divide the data into a plurality of secure components;

encrypt the secure components, wherein the encrypting includes storing the plurality of secure components on a plurality of intelligent agents;

move each intelligent agent to a different location which is substantially inaccessible to an unauthorized request;

store the intelligent agents at the different locations for a period of time;

continuously repeat the moving and storing such that each of the secure components is moved and stored at other different locations, wherein the continuously repeating of the moving and storing constantly relocates the intelligent agents until an authorized request is received;

move all of the intelligent agents to a single location in response to receipt of the authorized request;

decrypt each of the secure components stored on the intelligent agents, wherein decrypting includes accessing the secure components stored on the intelligent agents; and assemble the plurality of secure components to reconstruct the original data.

11. The method of claim 10 wherein the locations to which the secure components are sent comprise a plurality of interconnected servers positioned at different geographical locations.

12. The method of claim 10 wherein the data comprises a security key.

13. The method of claim 10 wherein the encrypting the secure components is performed using a plurality of intelligent agents.

14. The method of claim 13 wherein the intelligent agents house the secure components.

15. The method of claim 13, wherein the intelligent agents communicate with a central controller, to move the secure components.

16. The method of claim 13 wherein the intelligent agents communicate with each other.

17. The method of claim 13 wherein the intelligent agents access a variety of devices including computers, switches, PDAs and cellular telephones.

18. The method of claim 13 wherein the intelligent agents travel through different media and receive messages through different media.

19. A non-transitory computer program product for securely storing data, the computer program product comprising a computer readable storage medium having program code embodied therewith, the program code executable by a computing device to perform a method comprising:

dividing the data into a plurality of secure components;

encrypting the secure components, wherein the encrypting includes storing the plurality of secure components on a plurality of intelligent agents;

moving each intelligent agent to a different location which is substantially inaccessible to an unauthorized request;

storing the intelligent agent at the different locations for a period of time;

continuously repeating the moving and storing such that each of the intelligent agents is moved and stored at other different locations, wherein the continuously repeating of the moving and storing constantly relocates the intelligent agents until an authorized request is received;

moving all of the intelligent agents to a single location in response to receipt of the authorized request;

decrypting each of the secure components stored on the intelligent agents, wherein decrypting includes accessing the secure components stored on the intelligent agents; and assembling the plurality of secure components to reconstruct the original data.

20. The computer program product of claim 19 wherein the program code is further configured to enable the computing device to move all of the secure components to a single location on receipt of a request from an authorized user.

* * * * *